US006256163B1

United States Patent
Schmidt et al.

(10) Patent No.: US 6,256,163 B1
(45) Date of Patent: Jul. 3, 2001

(54) METHOD AND APPARATUS FOR PERFORMING CURRENT SHAPING FOR SEEKING ACOUSTICS REDUCTION IN A DISK DRIVE

(75) Inventors: Thorsten Schmidt, Milpitas; Jwo-min Wang, Sunnyvale, both of CA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/036,505

(22) Filed: Mar. 6, 1998

(51) Int. Cl.$^7$ .................................................. G11B 5/596
(52) U.S. Cl. ..................... 360/78.09; 360/78.04; 360/78.06
(58) Field of Search .................. 360/78.09, 78.04, 360/77.02, 78.06, 78.07

(56) References Cited

U.S. PATENT DOCUMENTS

| | | | |
|---|---|---|---|
| 4,916,635 | | 4/1990 | Singer et al. ........................ 364/513 |
| 4,956,831 | * | 9/1990 | Sarraf et al. ........................ 369/32 |
| 5,325,247 | * | 6/1994 | Ehrlich et al. ...................... 360/78.09 |
| 5,465,034 | * | 11/1995 | Andrews, Jr. et al. ............... 318/560 |
| 5,475,545 | * | 12/1995 | Hampshire et al. ............... 360/78.06 |
| 5,566,148 | * | 10/1996 | Takahara et al. ..................... 369/32 |
| 5,638,267 | | 6/1997 | Singhose et al. .................... 364/148 |
| 5,668,680 | * | 9/1997 | Tremaine .......................... 360/78.07 |
| 5,675,558 | * | 10/1997 | Katoh .................................... 369/32 |
| 5,751,513 | * | 5/1998 | Phan et al. ........................ 360/78.07 |
| 5,825,582 | * | 10/1998 | Supino et al. ..................... 360/78.06 |
| 5,901,009 | * | 5/1999 | Sri-Jayantha et al. ............ 360/78.07 |
| 5,940,239 | * | 8/1999 | Lee et al. .......................... 360/77.02 |
| 6,046,878 | * | 4/2000 | Liu et al. ............................... 360/75 |
| 6,052,252 | * | 4/2000 | Kim .................................. 360/78.09 |

* cited by examiner

Primary Examiner—Hoa T. Nguyen
Assistant Examiner—Dan I. Davidson

(57) ABSTRACT

Methods and apparatus for reducing overall seeking acoustics in a head-disk apparatus are disclosed. In accordance with one aspect of the present invention, a method for reducing overall seeking acoustics in a disk drive apparatus, which includes an actuator, involves calculating an error that is a measure of a difference between a desired trajectory for the actuator and an actual trajectory for the actuator, and calculating a preliminary gain. The method also includes determining when the preliminary gain exceeds a minimum acceptable gain limit, and updating a current command using the preliminary gain and the velocity error when the preliminary gain exceeds the minimum acceptable gain limit. The preliminary gain is generally arranged to enable the updated current command to reduce the overall seeking acoustics. The updated current command is sent to a power amplifier which then generates a seek current signal using the power amplifier and the updated current command. The updated current command allows the actual trajectory to substantially follow the desired trajectory.

15 Claims, 4 Drawing Sheets

METHOD AND APPARATUS FOR PERFORMING CURRENT SHAPING FOR SEEKING ACOUSTICS REDUCTION IN A DISK DRIVE

BACKGROUND OF THE INVENTION

1. Field of Invention

The present invention relates generally to methods and apparatus for use in disk drives for computer systems. More particularly, the present invention relates to methods and apparatus for reducing the vibration of high frequency resonance modes associated with seeking acoustics in disk drives for computer systems.

2. Description of the Relevant Art

The reduction of noise, or vibrations, in disk drives is crucial to ensure that performance issues associated with a disk drive may be minimized. When the performance of a disk drive is not at an acceptable level, customer dissatisfaction regarding the disk drive may be significant, and the integrity of data stored on the disk drive may be compromised. By way of example, when a disk drive experiences excessive vibration, a customer may perceive the disk drive to be operating in a faulty manner. Therefore, the magnitude of the vibrations experienced on a disk drive must generally be reduced to acceptable levels.

FIG. 1 is a diagrammatic representation of a disk drive assembly suitable for use in a computer system. A disk drive assembly 102, which may also be known as a head-disk assembly (HDA), includes a platter assembly 104 that is situated on a base plate 103. Platter assembly, as shown, includes a platter 105 and a spindle mechanism 106. Spindle mechanism 106 typically includes a spindle bearing 107 which is coupled to platter 105, or a disk. Data is stored, or otherwise encoded, on platter 104. Platter 104 may contain multiple spokes 108, each of which includes encoded position information. That is, each spoke 108 contains track numbers and patterns to determine fractional positions which relate to the location of a disk drive, or read/write, head 120 with respect to platter 104.

Disk drive assembly 102 also includes an actuator assembly 114. Actuator assembly 114 includes an actuator 118 which supports disk drive head 120. Actuator assembly 114 is arranged to move disk drive head 120 to different positions over platter 105 such that data may be retrieved from or stored to different data-carrying sectors of platter 105. In general, when disk drive head 120 is to be moved, torque is generated to pivot or otherwise move actuator assembly 114 by a motor assembly 122. Motor assembly 122 is generally mechanically coupled to actuator assembly 114 through an actuator bearing 124.

Actuator motor assembly 122 often includes a coil structure and a magnetic field which surrounds the coil structure, as will be appreciated by those skilled in the art. In other words, actuator motor assembly 122 typically includes a voice coil motor (VCM). By passing current through the coil structure in a particular direction and for a specified length of time, actuator assembly 114 may be moved, e.g., pivoted, such that disk drive head 120 is positioned over a specific portion of the platter 105. The pivoting of actuator assembly 114 to position disk drive head 120 in a desired position is generally known as a "seek."

A spindle bearing 107, which is coupled to a spindle motor (not shown), allows platter 105 to spin with respect to base plate 103. Typically, noise is associated with the rotation of platter 105. Specifically, motor noise associated with a spindle motor, i.e., "spindle noise," contributes to idle acoustics, or acoustics which are present while platter 105 is spinning. The amount of idle acoustics increases as the spinning speed of platter 105 increases. Further, if spindle bearing 107 is not perfectly circular, spindle bearing 107 may further contribute to idle acoustics.

Although the level of idle acoustics in a disk drive assembly may vary, e.g., the level of idle acoustics may depend upon the mechanical design of the disk drive assembly, idle acoustics are typically in the range of approximately 35 decibels (dB) to approximately 40 decibels when the platter spinning speed is approximately 4000 revolutions per minute (RPM). By way of example, idle acoustics in the range of approximately 37 dB to approximately 38 dB are typically the market requirement for 5.25 inch disk drives which have a spindle speed of approximately 4000 RPM.

Acoustics associated with seeking processes, referred to herein as "additional seeking acoustics," are additive with respect to idle acoustics. In other words, acoustics are affected by both idle acoustics and additional seeking acoustics. Generally, the "sum" of idle acoustics, which are caused by the spinning of platter 105, and additional seeking acoustics, which result from the performance of a seek, is considered to be the overall seeking acoustics.

Additional seeking acoustics are typically the result of disk drive structural vibration induced by the seek current. Current is sent through the VCM, i.e., the VCM that is a part of motor assembly 122, to create a torque which is applied to actuator assembly 114 in order to move actuator assembly 114. FIG. 2a is a block diagram which illustrates a conventional system used to generate a torque starting with a current command that is provided by a seek program. A current command 204 is sent to a digital-to-analog (D/A) converter 206, or a pulse width modulator (PWM) to produce a control voltage 207 which is proportional to current command 204, numerically. Current command 204 is sent to D/A converter 206 which, in turn, feeds control voltage 207 into a power amplifier 208, in response to a seek command, or a request to move an actuator assembly in order to position a disk drive head. Power amplifier 208 processes, e.g., amplifies, current command 204 to generate a motor input current 212, or a seek current.

Motor input current 212 is effectively arranged to produce a torque 220 that causes an actuator to move. Specifically, motor input current 212 causes an actuator motor 216 to create torque 220 that moves an actuator to a desired location. Torque 220 may cause the actuator to accelerate, decelerate, or move at a constant velocity. In other words, motor input current 212 is arranged to generate torque 220 that causes an actuator to rotate to a desired position for the actuator as required by a seek command. The profile of motor input current 212 is dependent upon the profile of current command 204.

In order to move an actuator, e.g., actuator assembly 118 of FIG. 1, efficiently to a desired position, the amount of current sent to the VCM is often adjusted substantially instantaneously, as will be described in more detail below with respect to FIGS. 2b and 2c. While the level of noise associated with the VCM during a seek may be widely varied, the level of noise, i.e., the additional seeking acoustic, is typically in the range of approximately 5 dB to approximately 10 dB in sound power, as for example approximately 7 dB.

In general, acceptable levels of overall seeking acoustics in disk drive assemblies are determined based upon what is considered to be tolerable by customers who use the disk drive assemblies. For 5.25 inch disk drives, an overall seeking acoustic which is no more than approximately 45 dB is generally considered to be acceptable, although an overall seeking acoustic which is less than approximately 40 dB is preferred. However, as overall seeking acoustics are often in the range of approximately 45 dB to approximately 50 dB, many disk drives fail to meet acceptable levels of noise during seek operations. Failure to meet acceptable levels for overall seeking acoustics may lead to disqualification of disk drives by customers, as well as performance issues related to the disk drives.

Additional seeking acoustics result from large changes of amplitude in a motor input current which is used to create a torque on an actuator motor. As will be appreciated by those skilled in the art, changes in seek current are correlated to the amount of noise associated with a seek command. Specifically, a higher level of noise is generally attributed to a more rapid change in a current level.

FIG. 2b is a graphical representation of a relationship between a current command and time. A current command or a series of current commands, as for example current command 204 of FIG. 2a, is provided as an input to D/A converter or a PWM which is in communication with a power amplifier. Current command has a profile 240 which effectively has an infinite "beginning" slope 244, or an acceleration phase. Beginning slope 244 is approximately infinite due to the fact that a rapid increase from zero current to a current level which saturates a power amplifier allows the seek time, i.e., the time associated with a seek operation, to be minimized. The power amplifier is operated at saturation, or in saturation mode, to minimize the seek time associated with performing a seek. In addition to beginning slope 244, current command profile 240 also has a "change in polarity" section 248, followed by an ending deceleration section 252, both of which are associated with gradually returning profile 240 to a level of zero current, thereby ending the seek.

With reference to FIG. 2c, the seek current that is sent to an actuator motor in response to the current command of FIG. 2b, will be described. An input current profile 260 is effectively a seek current, or a forcing function which causes an actuator to move. A seek current is arranged to create a bang-bang seek, or a near bang-bang seek. Such a seek is a seek in which maximum current levels are used to create maximum torque levels to efficiently move an actuator. Input current profile 260 is generated when current command profile 240 is passed through a D/A converter, or a PWM, as well as a power amplifier, and is used to create a torque in an actuator motor. A beginning section 264 of input current profile 260 is "rugged," i.e., has a relatively large slope. As shown, beginning section 264, which is typically the one-third stroke seek, has a substantially exponential shape, after an initial sudden change of slope 265. The ruggedness of beginning section 264 signifies an abrupt change in the motor input current which initiates vibration of the disk drive in addition to the desired actuator movement. Input current profile 260 reaches a maximum value 266 which corresponds approximately to the saturation level for the power amplifier which produces input current profile 260, given current command profile 240 of FIG. 2b. A "polarity reversal" section 268 of input current profile 260 signifies a transition from acceleration to deceleration. An ending section 272 signifies a final deceleration which causes the actuator to decelerate and eventually return to rest.

Mechanical solutions are often used in order to reduce overall seeking acoustics. Most mechanical solutions use dampers to damp out vibrations. One common mechanical solution that is used to reduce the overall seeking acoustics involves the use of a foam damping layer. A foam damping layer is mounted on surfaces that emit sound waves, as for example on the top cover of a disk drive. Such a foam damping layer is arranged to absorb energy and, therefore, reduce vibrations on the overall disk drive. However, although the use of a foam damping layer is effective to reduce overall seeking acoustics, the use of a foam damping layer reduces overall seeking acoustics by no more than approximately 2 dB. Further, the use of a foam damping layer is expensive, as it is an additional part that is added to a disk drive, and also requires additional manufacturing time to mount the foam damping layer on the disk drive. As such, the use of a foam damping layer is often not desirable, since the costs associated with the foam damping layer are relatively high given the reduction of overall seeking acoustics that is possible using the foam damping layer. However, foam damping layers are often still used to at least slightly reduce overall seeking acoustics.

Another common mechanical solution which is intended to reduce overall seeking acoustics involves the use of rubber pieces within a disk drive. Specifically, rubber pieces are placed within the disk drive between the actuator motor, or the VCM, and the top cover of the disk drive to reduce the relative motion between the VCM and the top cover. Hence, the rubber pieces are intended to reduce overall seeking acoustics by absorbing energy. As was the case with using a foam damping layer, the rubber pieces also do not significantly reduce overall seeking acoustics. For example, the use of rubber pieces generally does not reduce overall seeking acoustics by more than approximately 1 dB. In addition, the use of rubber pieces is expensive due to the fact that the cost associated with creating the rubber pieces, as well as the time associated with accurately positioning the rubber pieces between the VCM and the top cover, is significant with respect to the reduction of overall acoustics attributed to the use of the rubber pieces. Therefore, the use of rubber pieces to absorb energy may be considered to be a less than desirable solution to the problem of reducing the overall seeking acoustics in a disk drive.

Notch filters are also conventionally used to reduce overall seek-induced vibrations in a disk drive. Although notch filters are mostly used to remove actuator resonances for read/write purposes, notch filters reduce seeking acoustics as well. In particular, notch filters are used to shape the current which used by a VCM to generate a torque, i.e., the seek current. As will be appreciated by those skilled in the art, within the audible frequency range, which ranges from approximately 50 Hertz (Hz) to approximately 10 kiloHertz (kH), there are approximately ten resonant modes. Each notch filter is arranged to notch out, or remove, a particular resonant mode. Since each notch filter used increases the level of instability in the overall disk drive, or, more particularly, the servo arrangement associated with the disk drive, only a few resonant modes may be removed from the overall seeking acoustics. It has been observed that no more than three or four notch filters which are arranged to remove three or three resonant modes may be used without significantly affecting the stability of the overall disk drive. As such, only three or four resonant modes may be selected as being resonant modes which are to be notched out. Therefore, since most resonant modes may not be notched out, overall seeking acoustics are not substantially reduced using notch filters. Further, the use of notch filters often increases the seek time associated with performing a seek.

Many techniques which are used to reduce vibrations in general physical systems may also be applied to disk drive systems in order to reduce overall seeking acoustics in the disk drive systems. One technique which is used is known as current shaping. Current shaping techniques process a current command in order to "round out" the resultant real current. That is, current shaping techniques attempt to smooth out abrupt changes in slope. Such current-shaping techniques are often used to reduce the residual vibrations in a given system. One current-shaping techniques is an "input shaper," which is described in U.S. Pat. No. 5,638,267, issued Jun. 10, 1997, which is incorporated herein by reference in its entirety.

Input shaper techniques generally identify some resonant modes, or frequencies, and essentially remove the frequency components from the current commands. such that a real current is characterized by a relatively smooth curve. In other words, input shaper techniques are arranged to process current commands, using what is commonly known as an "input shaper filter," such that certain resonant frequencies are removed from the input current commands. In some cases, there are only a few resonant frequencies which are not excited by the resultant real current, i.e., some resonant frequencies remain excitable. To effectively cancel out selected resonant frequencies using an input shaper, a knowledge of the resonance modes of the system being controlled is required.

Input shaper techniques typically do not cause system instability. Hence, input shaper techniques may be used to remove a relatively high number of resonant frequencies. However, input shaper techniques are not readily adaptable for use in disk drive technology. That is, modifying input shaper techniques for use in disk drive systems is often complicated, since servo code associated with disk drive systems is arranged to perform a phase-plane seek, as will be appreciated by those skilled in the art, while input shaper techniques are time-based. As reconfiguring input shaper techniques to perform a phase-plane seek may be complicated and time-consuming, and only selected resonant modes are rendered unexcitable, i.e., the overall seeking acoustics may not necessarily be reduced to an acceptable level, the use of such current shaping techniques in disk drive systems may not be desirable. Additionally, conventional current shaping, and input shaping, techniques also require knowledge of the resonant modes in a particular disk drive system.

Other current shaping techniques involve the calculation of velocity errors, i.e., differences between a desired trajectory for an actuator and an actual trajectory in distance and velocity space. FIG. 3 is a graphical representation of a desired seek trajectory and an actual seek trajectory. As shown, a desired seek trajectory 304 and an actual seek trajectory 308 for a disk drive head coupled to an actuator are graphically represented in a distance-velocity domain. That is, desired seek trajectory 304 and actual seek trajectory 308 represent velocities plotted versus distance, where the distance is the distance of the disk drive head from a desired location, e.g., the target of a seek operation.

Velocity errors 312 vary as a disk drive head moves with respect to a desired location. By way of example, velocity error 312, which is measured near the beginning of a seek, is substantially greater in magnitude than velocity error 312b, which is measured near the middle of a seek. Near end 316 of a seek, there is substantially no velocity error, as shown. Hence, near end 316 of the seek, the disk drive head is effectively on track, or at its desired location.

Velocity errors 312, as mentioned above, are used in some current shaping techniques. In particular, velocity errors 312 are used in current shaping techniques which are arranged to reduce the overall seeking acoustics associated with the deceleration portion of a seek. A current command used for such a current shaping technique is often expressed as follows:

$$CurrentCommand = Feedforward + K1*VelocityError + Forces$$

where the "feedforward" term includes data generated during the acceleration portion of a seek, and the "forces" term includes such forces as a calibrated bias force and the bias force associated with an estimator. The "velocity error" term reflects the difference between desired seek trajectory 304 and actual seek trajectory 308, and is generally measured in terms of tracks per control interval. K1 is a constant gain which is arranged to derate a velocity gain, and is typically chosen to minimize the velocity error and, hence, the amount of noise, associated with end 316 of the seek. K1 is constant in that once a value for K1 is set, that value of K1 is not altered during the creation of a seek current which is generated using the current command expression above.

In general, if K1 is chosen to minimize the velocity error at end 316 of seek, then, as shown, a beginning deceleration portion 320, which corresponds to change of polarity section 268 of FIG. 2c, is characterized by substantially sinusoidal-type oscillations. In other words, when K1 in the current command expression is chosen to minimize velocity error at end 316 of seek, deceleration portion 320 is characterized by multiple, relatively abrupt, changes in slope that result from a bandwidth that is too high. The abrupt changes in slope result from the variation in velocity error increases when the absolute value of the velocity increases, as is typically the case in the middle of a seek. A larger variation in velocity error results in a larger variation in command current, and is a source of acoustic noise. As described above, abrupt changes in slope in seek current and, hence, an actual seek trajectory, cause an increase in additional seeking acoustics and, as a result, the overall seeking acoustics.

Alternatively, if K1 is chosen to reduce the sinusoidal-type oscillations in the actual seek trajectory, then the velocity error at end 316 of the seek may be relatively high. For example, the disk drive head may never accurately reach its desired location, e.g., the on-track performance of the overall disk drive may be unacceptable. In some cases, the seek time required for the disk drive head to reach its desired location may be high, even when on-track performance is considered to be acceptable. As accuracy is crucial and shorter seek times are more efficient than longer seek times, a relatively long seek time is often considered to be undesirable In view of the foregoing, what is desired is a method and an apparatus for efficiently and effectively reducing the overall seeking acoustics in a disk drive system. More particularly, what is desired is a method and an apparatus for efficiently and effectively reducing the additional seeking acoustics associated with the deceleration portion of a seek operation.

SUMMARY OF THE INVENTION

The invention relates to methods and apparatus for reducing overall seeking acoustics in a head-disk apparatus. In accordance with one aspect of the present invention, a method for reducing overall seeking acoustics in a disk drive apparatus, which includes an actuator, involves calculating an error that is a measure of a difference between a desired trajectory for the actuator and an actual trajectory for the actuator, and calculating a preliminary gain. The method also includes determining when the preliminary gain exceeds a minimum acceptable gain limit, and updating a current command using the preliminary gain and the velocity error when the preliminary gain exceeds the minimum acceptable gain limit. The preliminary gain is generally arranged to enable the updated current command to reduce the overall seeking acoustics. The updated current command is sent to a power amplifier which then generates a seek current signal using the power amplifier and the updated current command. The updated current command allows the actual trajectory to substantially follow the desired trajectory.

In one embodiment, when the preliminary gain does not exceed the minimum acceptable gain limit, the current command is updated using the minimum acceptable gain limit and the velocity error. In another embodiment, updating the current command includes updating a deceleration portion of the current command.

According to another aspect of the present invention, a method for processing a seek request in a disk drive apparatus that has a platter and an actuator assembly arranged to move with respect to the platter includes receiving a seek request on servo code associated with the disk drive apparatus. The seek request includes a deceleration portion arranged to cause the actuator assembly to decelerate. The method further includes calculating a deceleration term for a current command in response to the servo request such that calculating the deceleration term includes updating a gain factor to enable the deceleration term to reduce the overall seeking acoustics associated with the disk drive apparatus. A deceleration seek current is then generated using the deceleration term.

In one embodiment, calculating the deceleration term includes calculating a difference between a desired trajectory for the actuator assembly and an actual trajectory for the actuator assembly, determining a preliminary gain using the desired trajectory, and determining whether the preliminary gain is larger than the minimum acceptable gain. In such an embodiment, updating the gain factor may also include setting the gain factor to equal the preliminary gain when the preliminary gain is larger than the minimum acceptable gain, or, alternatively, setting the gain factor to equal the minimum acceptable gain when the preliminary gain is smaller than the minimum acceptable gain.

According to still another aspect of the present invention, a disk drive apparatus includes a platter, an actuator motor, and an actuator assembly coupled to the actuator motor such that the actuator assembly is moved over the platter by the actuator motor. The disk drive apparatus also includes a servo mechanism which generates a deceleration current command value by adjusting a gain factor and multiplying the gain factor by a difference between an actual trajectory for the actuator motor and a desired trajectory for the actuator motor. In addition, the disk drive apparatus includes a power amplifier that is coupled to the servo mechanism and to the actuator motor such that the power amplifier receives the deceleration current command value and uses it to generate an input current wave form to drive the actuator motor. In one embodiment, the servo mechanism generates the deceleration current command value without knowledge of resonant modes associated with the disk drive apparatus.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

The present invention will now be described in detail with reference to a few preferred embodiments thereof as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

In accordance with one embodiment of the present invention, a current command is used to effectively shape the deceleration portion of a seek current such that additional seeking acoustics associated with the deceleration portion may be reduced. Specifically, a current command, e.g., a shaping command, is arranged to produce a seek current that reduces oscillatory characteristics in a seek trajectory without significantly compromising seek time and overall performance. Reducing the oscillatory characteristics in the seek trajectory without causing an increase in seek time also allows the additional seeking acoustics associated with a seek to be reduced such that the overall seeking acoustics may fall within an acceptable range. By allowing gains used in the generation of a current command to be varied as necessary during a seek, additional seeking acoustics may be reduced without adversely affecting seek time.

In 5.25 inch disk drives, the additional seeking acoustics are typically in the range of approximately 0 dB to approximately 5 dB, which generally allows the overall seeking acoustics to fall in the range of approximately 35 dB to approximately 45 dB. It should be appreciated that the idle acoustics may be controlled such that given additional seeking acoustics in the range of approximately 0 dB to approximately 5 dB, overall seeking acoustics fall below approximately 40 dB, which is considered to be a preferred level. For other disk drives, e.g., 3.5 inch disk drives, the additional seeking acoustics may fall within a different range than the additional seeking acoustics associated with 5.25 inch disk drives.

Figure 1:
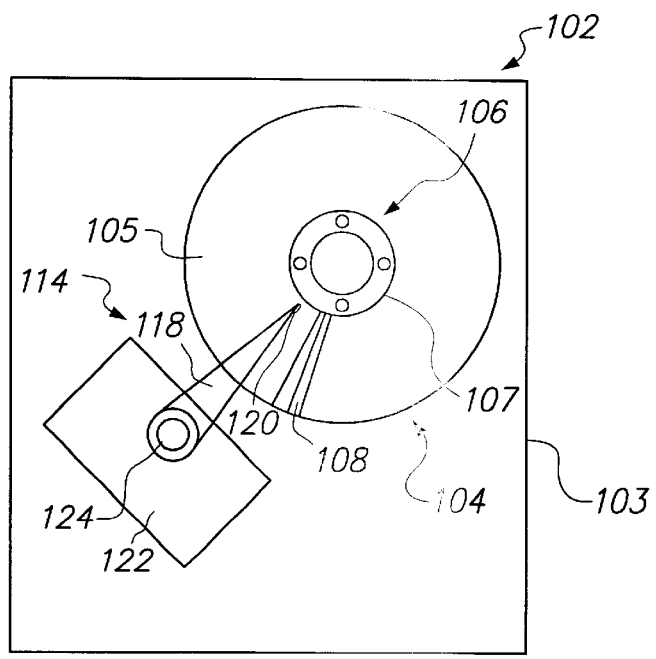
FIG. 1 is a diagrammatic representation of a disk drive assembly.
Figure 2A:
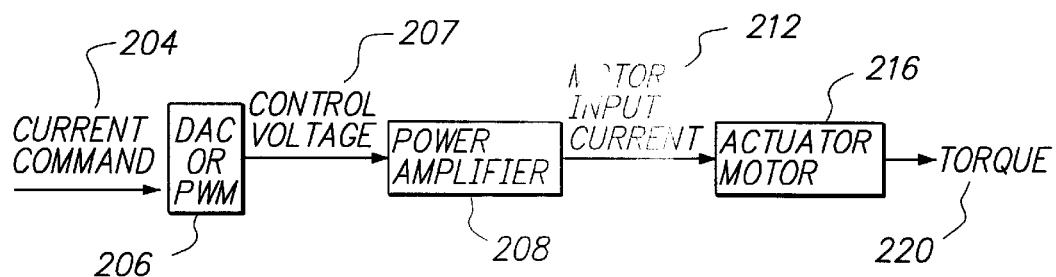
FIG. 2a is a block diagram representation of a conventional digital system used to generate a torque using current commands.
Figure 2B:
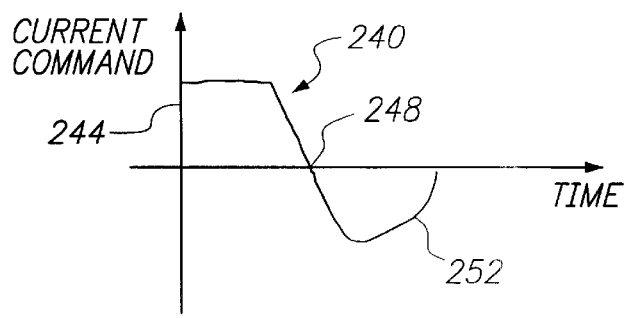
FIG. 2b is a graphical representation of a relationship between a current command and time.
Figure 2C:
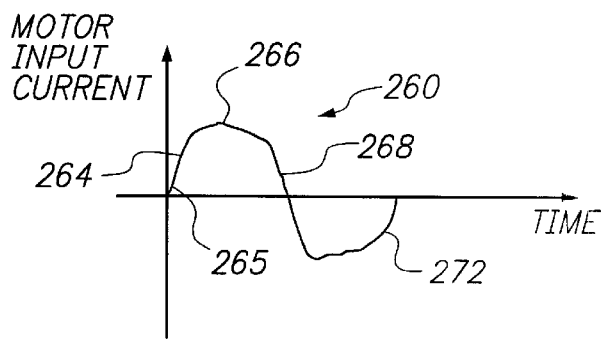
FIG. 2c is a graphical representation of a relationship between a motor input current, generated by the current commands as shown in FIG. 2b, and time.
Figure 3:
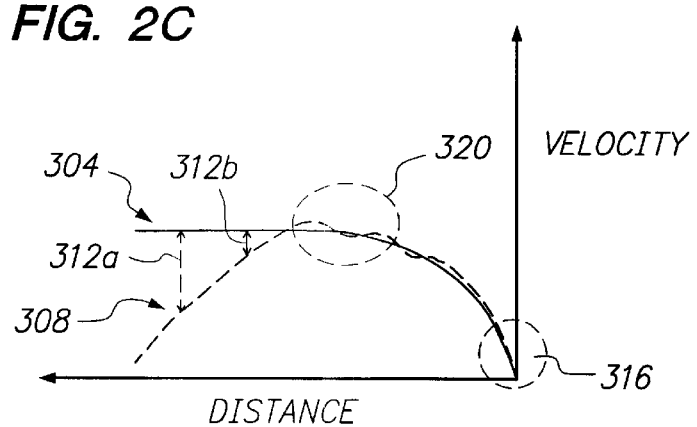
FIG. 3 is a graphical representation of a desired seek trajectory and an actual seek trajectory.
Figure 4A:
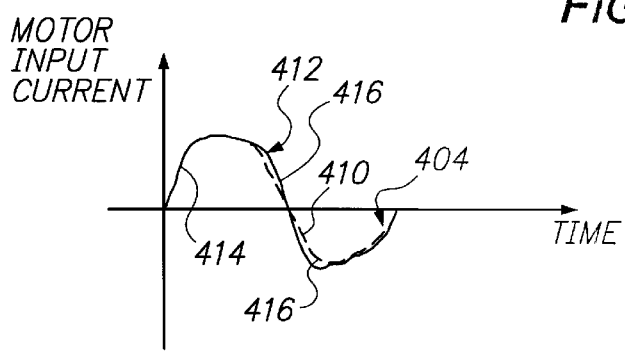
FIG. 4a is a graphical representation of a relationship between a motor input current and time in accordance with an embodiment of the present invention.

FIG. 4a is a graphical representation of a seek current profile produced by a current command profile in accordance with an embodiment of the present invention. The generation of a current command profile that is suitable for generating a seek current profile 404 will be described below. Seek current profile 404 is arranged to enable the deceleration section of an actuator seek trajectory to remain substantially non-oscillatory. Specifically, the slope of change in polarity section 410 of seek current profile 404, as seek current profile 404 transitions from a beginning section 414, i.e., an acceleration portion, to an ending section 416, is less steep than change in polarity section 416 of a conventional current profile 416. It should be appreciated that conventional current profile 416 is a current profile which is not arranged to reduce oscillatory motion at the beginning of a deceleration section without compromising overall seek time.

As shown, when the slope of change in polarity section 410 is less steep, the profile of ending section 416, which corresponds to current arranged to cause an deceleration in the motion of an actuator, is relatively smooth. That is, oscillatory behavior of ending section 416 is substantially eliminated. Hence, the additional seeking acoustics associated with ending section 416 are reduced. Although the amount of reduction in the additional seeking acoustics which may be achieved may vary, in one embodiment, e.g., an embodiment in which the associated disk drive is a 5.25 inch disk drive, the additional seeking acoustics may be reduced by up to approximately 5 dB. For example, the additional seeking acoustics may be reduced by between 0.5 dB and approximately 3 dB.

Figure 4B:
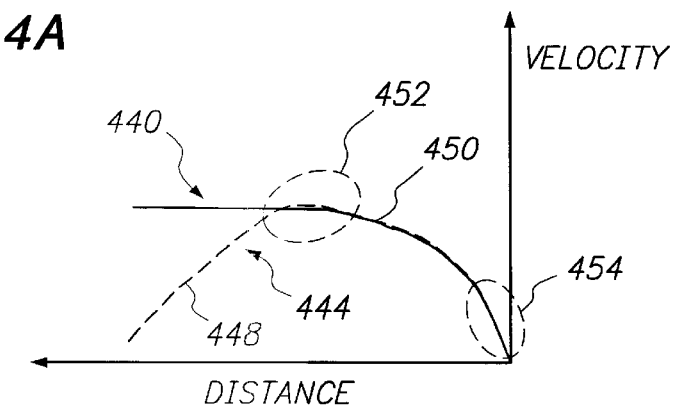
FIG. 4b is a graphical representation of a desired seek trajectory and an actual seek trajectory generated using the motor input current of FIG. 4a in accordance with an embodiment of the present invention.

With reference to FIG. 4b, an actual seek trajectory generated using the seek current of FIG. 4a will be described in accordance with an embodiment of the present invention. A desired seek trajectory 440 for an actuator in a disk drive is shown, along with an actual seek trajectory 444 for the actuator. A beginning section 448 of actual seek trajectory 444 corresponds to the acceleration of the actuator and, hence, the disk drive head that is generally mounted on the actuator. A deceleration section 450 of actual seek trajectory 444 leads into an ending section 454 of actual seek trajectory 444.

In the described embodiment, middle section 452 of a seek or, the beginning of deceleration section 450, is substantially smooth. That is, middle section 452 does not include oscillatory, or sinusoidal, characteristics which correspond to noise and, hence, created additional seeking acoustics. As a result, the bandwidth associated with middle section 452 is reduced such that resonant frequencies associated with middle section 452 are not excitable. In order to achieve a substantially smooth middle section 452 with relatively low velocity error, the gain used to generate an associated current command may be relatively low, as will be described below. As shown, ending section 454 of actual seek trajectory 444 effectively tracks desired seek trajectory 440. Therefore, the gain used to generate a current command that produces ending section 454 is relatively high, i.e., the gain is arranged to allow ending section 454 to follow seek trajectory 444.

In order for actual seeking trajectory 444 to accurately track desired seeking trajectory 440 through deceleration section 450 and ending section 454, the gain used to generate a current command varies. A current command which compensates for oscillatory characteristics in a seek current and, hence, a seek trajectory, without substantially affecting seek time or compromising on-track performance may be given as follows:

$$\text{CurrentCommand} = \text{Feedforward} + K2 * \text{VelocityError} + \text{Forces}$$

where the "feedforward" term includes data generated during the acceleration portion of a seek, the "velocity error" term represents the deviation between a desired seek trajectory and an actual seek trajectory, and the "forces" term includes any number of different forces. Such forces include, but are not limited to, a calibrated bias force, the bias force associated with an estimator that is arranged to determine velocity error, and the run-out associated with a disk drive spindle. It should be appreciated that any and all terms in the expression for current command may be scaled such that the terms are consistent, i.e., such that the units on each term are consistent.

Gain K2 is a variable gain, i.e., gain K2 may vary throughout the course of a seek. In particular, gain K2 may be varied such that the current command is suitable for effectively eliminating oscillatory characteristics near the middle of a seek, i.e., at the beginning of a deceleration, and suitable for ensuring on-track performance with an acceptable seek time. Specifically, for an embodiment in which the current command is applied within a 5.25 inch disk drive, gain K2 may range from approximately 0.1 to approximately 0.7 in units defined as approximately the inverse of the associated control interval [CI], e.g., 1/CI. Values for gain K2 which are in a lower range, e.g., approximately 0.1 to approximately 0.3 per control interval, are particularly suitable for use near the middle of a seek, whereas values for K2 which are in a higher range, e.g., approximately 0.4 to approximately 0.6 per control interval are particularly suitable for use near the end of a seek. In one embodiment, a lower limit for gain K2 is approximately equal to half of the higher limit for gain K2. As will be appreciated by those skilled in the art, a lower value for gain K2 lowers the bandwidth, or stiffness, associated with a seek, whereas a higher value for gain K2 raises the bandwidth associated with a seek.

The value of gain K2 may be affected by any number of different factors. For example, gain K2 is affected by a velocity target. The velocity target is the desired speed of the actuator head, e.g., in tracks per control interval, for a particular time in the seek. Further, the velocity target is generally a function of position error, which is the difference between a present position and a target position, that may, for example, be obtained through the use of a look-up table.

At every control interval during a seek, a velocity target may be calculated. As such, at every control interval, gain K2 is updated as appropriate. Other factors which ay affect gain K2 include, but are not limited to, the number of tracks per inch on a disk drive platter, the full scale current which a power amplifier in a disk drive may produce, the size of the control intervals, and a torque factor, as will be appreciated by those skilled in the art.

Gain K2 is updated throughout a seek by calculating a temporary gain K2'. Temporary gain K2' is calculated as follows:

$$K2' = K2(\text{desired}) - \text{VelocityTargetTerm}$$

where K2(desired) is any "desired" value for gain K2. The desired value for gain K2 may be a default value chosen substantially at random. In one embodiment, K2(desired) is approximately the expected, or anticipated, value for gain K2 at the end of a seek operation. That is, K2(desired) may be the value of gain K2 which is anticipated to provide a predetermined, acceptable level of on-track performance. The velocity target term is effectively the value of velocity for the desired seek trajectory at for a given control interval multiplied by a predetermined constant factor that is arranged to derate a velocity gain, as will be appreciated by those skilled in the art.

Typically, gain K2' is used to compute gain K2. However, in some cases, the expression for gain K2' may yield either a value with a very low magnitude or, potentially, a negative value. In order to avoid performance issues associated with values for gain K2 which may be too low, e.g., below approximately 0.3 per control interval, in one embodiment, the computation of gain K2 is based on the maximum of a minimum acceptable K2 gain and gain K2' In other words, gain K2 may be given as follows:

$$K2 = \max[K2_{min}, K2']$$

where $K2_{min}$ is the minimum acceptable K2 gain. Although the value of the minimum acceptable K2 gain may be widely varied depending upon the requirements of a given system, in the described embodiment, the value is in the range of approximately 0.3 to approximately 0.5 per control interval.

As described above, a current command profile is generally arranged to create a seek current, or a motor input current, that drives an actuator motor within a disk drive apparatus to move an actuator and, hence, a disk drive head, in a seek trajectory. A seek current that is arranged to reduce the oscillatory characteristics in the deceleration section of a related seek trajectory has a "change in polarity" section that has a slope which does not change as abruptly as the slope of a seek current which is not arranged to reduce the oscillatory characteristics in a seek trajectory. In other words, in one embodiment of the present invention, a command current is arranged to create a change in polarity section in a seek current profile that allows a seek trajectory to be substantially smooth. As will be appreciated by those skilled in the art, a seek current profile is produced by a power amplifier using the current command profile or, more specifically, a control voltage that is generated when the current command profile passes through a D/A converter, PWM, or similar device.

Figure 5:
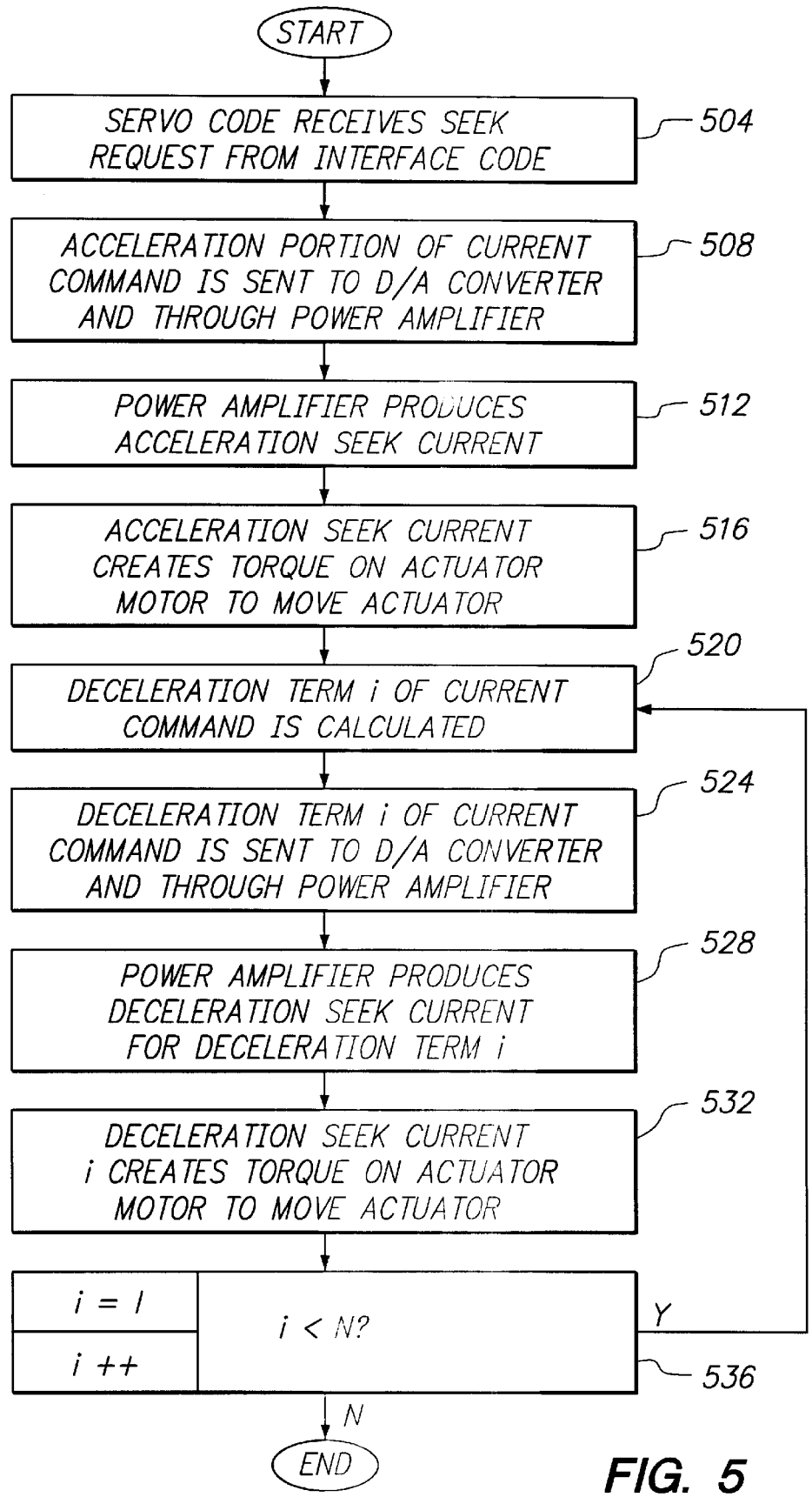
FIG. 5 is a process flow diagram which illustrates the steps associated with performing a seek in accordance with an embodiment of the present invention.

FIG. 5 is a process flow diagram which illustrates the steps associated with performing a seek in accordance with an embodiment of the present invention. It should be understood that a request for a seek is typically created by interface code when it is necessary to reposition a disk drive head. For example, when data is to be written to or retrieved from a disk drive platter, a seek request is created by interface code essentially to command the disk drive head to move with respect to the disk drive platter. The process of performing a seek begins at step 504 in which a seek request is received in servo code from interface code. That is, the seek request created by the interface code in response to a command to retrieve or write data is passed to servo code associated with the HDA. As will be appreciated by those skilled in the art, servo code is code that is arranged to operate circuitry associated with creating and sending a current command to a power amplifier which feeds an actuator motor.

After the seek request is received by the servo code, a current command is typically created by the servo code. In other words, a digital representation of a seek current is created. As described above with respect to FIG. 4a, the seek current includes an acceleration portion and a deceleration portion, which begins with a change in polarity section. In the described embodiment, once the seek request is received on the servo code, process flow proceeds to step 508 in which the acceleration portion of the current command is sent to a D/A converter, or similar device, and through a power amplifier. Although the acceleration portion of the current command may be generated using any suitable method.

In step 512, the power amplifier produces an acceleration seek current using the acceleration portion of the current command. Specifically, the power amplifier uses a control voltage produced by the D/A converter in response to the acceleration portion of the current command in order to generate the acceleration seek current. After the acceleration seek current is generated, the acceleration seek current is used to create a torque on an actuator motor of the disk drive assembly in step 516. The torque created on the actuator motor is used to move, i.e., rotate, the actuator and, hence, a disk drive head that is coupled to the actuator. That is, the actuator motor is used to move the disk drive head over a disk drive platter to a desired position during the course of performing a seek.

Once the acceleration seek current causes the actuator to be moved, process flow moves to step 520 in which a deceleration term "i" of the current command is calculated. As will be appreciated by those skilled in the art, a deceleration term is typically calculated for each control interval. Hence, a deceleration term "i" of the current command corresponds to the deceleration term associated with the "ith" control interval. The steps associated with calculating a deceleration term of the current command in accordance with an embodiment of the present invention will be described in more detail below with respect to FIG. 6.

Deceleration term "i" of the current command, once calculated, is sent through the power amplifier, via the D/A converter or a similar device in step 524. In step 528, the power amplifier produces a deceleration seek current that is associated with deceleration term "i" of the current command. The deceleration seek current is used to create a torque on the actuator motor to move the actuator in step 532.

After the deceleration seek current associated with deceleration term "i" of the current command is used to move the actuator, then in step 536, a determination is made as to whether there are more deceleration terms to be calculated. In other words, a determination is made regarding whether there are additional control intervals to be processed. If it is determined that no additional deceleration terms are to be calculated, then the implication is that the actuator has come to rest in its desired position, i.e., that the seek process has been completed. Accordingly, the steps associated with performing a seek are then completed. Alternatively, if the determination in step 536 is that there are additional deceleration terms to be calculated, the process flow returns to step 520 where the next deceleration term of the current command is calculated.

Figure 6:
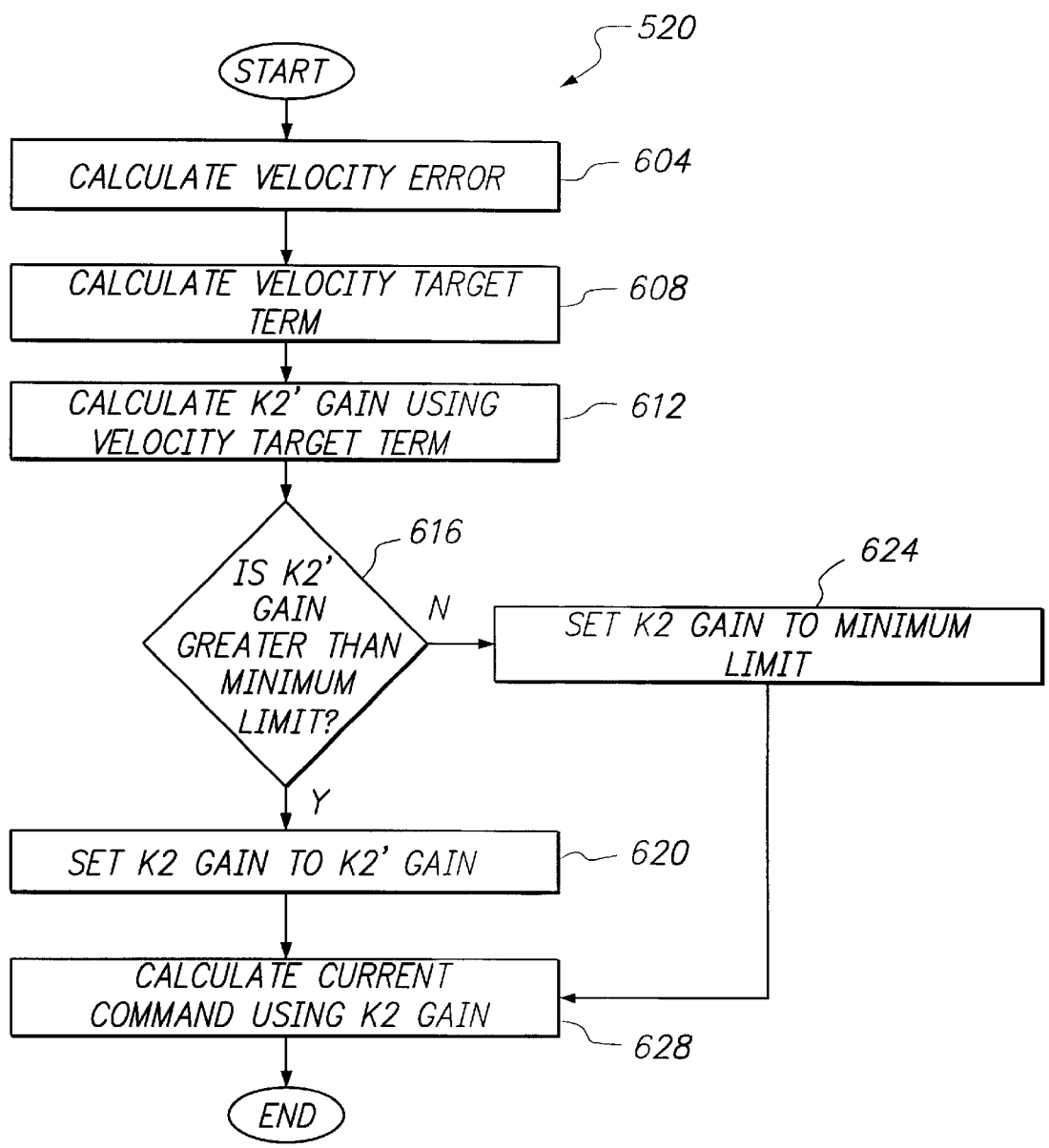
FIG. 6 is a process flow diagram which illustrates the steps associated with calculating a deceleration term of a current command, i.e., step 520 of FIG. 5, in accordance with an embodiment of the present invention.

With reference to FIG. 6, one method of calculating a deceleration term for a current command will be described in accordance with an embodiment of the present invention. That is, one embodiment of step 520 of FIG. 5 will be described. In general, the relationship used to generate deceleration terms for a current command takes the following form:

$$\text{CurrentCommand} \approx K2 * \text{VelocityError}$$

As previously described, the overall expression for current command may generally include a variety of different terms including, but not limited to, a feedforward term based on the acceleration portion of the current command, a bias term based on a calibrated bias force, a bias term based on the bias force of an estimator, and a run-out term based on spindle run-out.

The process of calculating a deceleration term for a current command begins at step 604 where a velocity error is calculated for a particular control interval. A velocity error is the discrepancy between a desired seek trajectory for an actuator and the actual seek trajectory for the actuator, as will be understood by those skilled in the art. Since the distance between the desired seek trajectory and the actual seek trajectory, as shown in FIG. 4b, will typically vary during the course of a seek, the velocity error also varies. In general, velocity error may be calculated using any suitable method. By way of example, velocity error may be computed using an estimator-based method.

After the velocity error is calculated in step 604, a velocity target term is calculated in step 608. The velocity target term is effectively the value of velocity for the desired seek trajectory multiplied by a pre-determined constant factor that is arranged to derate a velocity gain, as will be appreciated by those skilled in the art. The predetermined factor may generally be widely varied, and is dependent upon factors such as the size of a disk drive and the speed at which the disk drive rotates.

The velocity target term calculated in step 608 is used in step 612 in order to calculate a K2' gain. As discussed above, the K2' gain may be expressed as:

$$K2'=K2(\text{desired})-\text{VelocityTargetTerm}$$

where K2(desired) may be substantially any desired value for the K2 gain. In the described embodiment, K2(desired) is generally the desired value for the K2 gain at the end of a seek operation. That is, K2(desired) is the value of the K2 gain which allows the actual seek trajectory to substantially match the desired seek trajectory near the end of a seek.

A determination is made in step 616 regarding whether the K2' gain, as calculated in step 612, is greater than the minimum limit for the K2 gain. A minimum limit for the K2 gain, which is a value below which the K2 gain may not fall, is set to make certain that the K2 gain does not reach a level which affects the overall performance of a seek. Although the minimum value for the K2 gain may vary depending upon the physical characteristics of the overall disk drive assembly, the minimum value in one embodiment is typically in the range of approximately 0.3 to approximately 0.5 per control interval.

In general, the K2 gain is set to equal the higher of the K2' gain and the minimum limit for the K2 gain. Therefore, when it is determined that the K2' gain is greater than the minimum limit for the K2 gain, process flow proceeds to step 620 where the K2 gain is set to equal the K2' gain. Then, in step 628, a deceleration term of a current command, for a particular control interval, is calculated using the velocity error calculated in step 604 and the K2 gain. After the deceleration term of a current command is calculated, hen the overall process of calculating a deceleration term of a current command for a articular control interval is completed.

If the determination in step 616 is that the K2' gain is lower than the minimum limit for the K2 gain, then process flow moves from step 616 to step 624 in which the K2 gain is set to equal the minimum limit for the K2 gain. Once the K2 gain is set, then the K2 gain is used, in addition to the velocity error computed in step 604, to calculate a deceleration term of current command.

Although only a few embodiments of the present invention have been described, it should be understood that the present invention may be embodied in many other specific forms without departing from the spirit or scope of the invention. By way of example, although the present invention has been described in terms of reducing the noise in deceleration portions of a seek, it should be appreciated that the present invention may also be applied to reduce noise at substantially any section of a seek.

Further, the steps associated with performing a seek may generally be widely varied, e.g., specific steps may be reordered or altered. In addition, steps may also be removed or added without departing from the spirit or the scope of the present invention. It should be appreciated that the steps associated with calculating a deceleration term of a current command may also be widely varied. For example, the step of calculating a velocity error may take place at any time before the current command is calculated.

While the present invention has been described in terms of implementation with respect to 5.25 inch disk drives, it should be appreciated that the present invention may be implemented with respect to any suitable disk drive. For example, the present invention may be implemented for use in 3.5 inch disk drives. More generally, the present invention may be applied to any suitable physical system which requires current shaping.

Although a range of possible values for gain K2 have been described, the possible values of gain K2 may vary widely depending upon the requirements of a particular disk drive system. Such requirements may include, but are not limited to, the size of the disk drive system and spindle speed of the disk drive system. Additionally, the range of possible values may vary depending upon the units for the various terms used in calculating a current command. That is, since gain K2 may be thought of as a scaling factor, when the units for the terms that are being scaled change, the range of appropriate values for gain K2 also changes. In some embodiments, a maximum acceptable value of gain K2 may be approximated as being substantially equal to twice the minimum acceptable value of gain K2. Therefore, the present examples are to be considered as illustrative and not restrictive, and the invention is not to be limited to the details given herein, but may be modified within the scope of the appended claims.

What is claimed is:

1. A method for reducing overall seeking acoustics in a disk drive apparatus, the disk drive apparatus including an actuator, the method comprising:

calculating a velocity error, the velocity error being a measure of a difference between a desired trajectory for the actuator and an actual trajectory for the actuator;

calculating a preliminary gain;

determining when the preliminary gain exceeds a minimum acceptable gain limit;

updating a current command using the preliminary gain and the velocity error when the preliminary gain exceeds the minimum acceptable gain limit, wherein the preliminary gain is calculated to enable the updated current command to reduce the overall seeking acoustics;

sending the updated current command to a power amplifier; and generating a seek current signal using the power amplifier and the updated current command, wherein the updated current command is arranged to allow the actual trajectory to substantially follow the desired trajectory.

2. A method as recited in claim 1 wherein when the preliminary gain does not exceed the minimum acceptable gain limit, the method further includes:

updating the current command using the minimum acceptable gain limit and the velocity error.

3. A method as recited in claim 1 wherein updating the current command includes updating a deceleration portion of the current command.

4. A method as recited in claim 1 further including sending the updated current command to a digital-to-analog converter mechanism prior to sending the updated current command to the power amplifier.

5. A method as recited in claim 1 further including sending the seek current signal to an actuator motor, wherein the actuator motor produces a torque to move the actuator.

6. A method as recited in claim 5 wherein an additional seeking acoustic is created while the actuator moves.

7. A method for processing a seek request in a disk drive apparatus, the disk drive apparatus including a platter and an actuator assembly arranged to move with respect to the platter, the method comprising:

receiving a seek request on servo code associated with the disk drive apparatus, wherein the seek request includes a deceleration portion arranged to cause the actuator assembly to decelerate;

calculating at least one deceleration term for a current command in response to the seek request, wherein calculating the at least one deceleration term for the current command includes calculating a gain factor to enable the at least one deceleration term for the current command to reduce the overall seeking acoustic associated with the disk drive apparatus, calculating a difference between a desired trajectory for the actuator assembly and an actual trajectory for the actuator assembly, determining a preliminary gain using the desired trajectory, and comparing the preliminary gain with a minimum acceptable gain to determine when the preliminary gain is larger than the minimum acceptable gain; and generating a deceleration seek current using the at least one deceleration term for the current command.

8. A method for processing a seek request as recited in claim 7 wherein calculating the gain factor includes:

setting the gain factor to equal the preliminary gain when the preliminary gain is larger than the minimum acceptable gain; and setting the gain factor to equal the minimum acceptable gain when the preliminary gain is not larger than the minimum acceptable gain.

9. A method for processing a seek request as recited in claim 7 wherein calculating the at least one deceleration term for the current command further includes:

augmenting the difference between the desired trajectory and the actual trajectory using the gain factor; and summing the augmented difference with a feedforward term, the feedforward term including information relating to the seek request.

10. A method for processing a seek request as recited in claim 7 wherein calculating the at least one deceleration term for the current command further includes:

augmenting the difference between the desired trajectory and the actual trajectory using the gain factor; and summing the augmented difference with bias forces associated with the disk drive apparatus.

11. A method for processing a seek request as recited in claim 7 further including: generating a torque using the deceleration seek current, wherein the torque is arranged to move the actuator assembly.

12. A method for processing a seek request as recited in claim 7 further including:

calculating at least one acceleration term for the current command in response to the seek request;

generating an acceleration seek current using the at least one acceleration term for the current command; and generating a torque using the acceleration seek current, wherein the torque is arranged to move the actuator assembly.

13. A disk drive apparatus comprising:

a platter;

an actuator motor;

an actuator assembly coupled to the actuator motor, wherein the actuator motor is arranged to move the actuator assembly over the platter;

a servo mechanism arranged to generate at least one deceleration current command value, wherein the at least one deceleration current command value is generated by modifying a gain factor, the gain factor being multiplied by a difference between an actual trajectory for the actuator motor and a desired trajectory for the actuator motor; and a power amplifier, the power amplifier being coupled to the servo mechanism and to the actuator motor, wherein the power amplifier is arranged to receive the at least one deceleration current command value and to use the at least one deceleration current command value to generate an input current wave form to drive the actuator motor, wherein the at least one deceleration current command value is arranged to reduce overall seeking acoustics associated with the disk drive.

14. A disk drive apparatus as recited in claim 13 wherein the servo mechanism is arranged to generate the at least one deceleration current command value without knowledge of resonant modes associated with the disk drive apparatus.

15. A disk drive apparatus as recited in claim 13 further including a digital-to-analog converter, the digital-to-analog converter being coupled to the amplifier and being arranged to convert the at least one deceleration current command value into a value for the input current wave form.

* * * * *